United States Patent [19]

Gordon et al.

[11] 3,946,011
[45] Mar. 23, 1976

[54] S-TRIAZINE TETRACARBOXYLIC ACIDS AND DIANHYDRIDES

[75] Inventors: David A. Gordon, Scarsdale; Raymond Seltzer, New City, both of, NY

[73] Assignee: Ciba-Geigy Corporation, Ardsley, N.Y.

[22] Filed: July 17, 1974

[21] Appl. No.: 489,225

[52] U.S. Cl. 260/249.6; 260/243 AE; 260/247.5 C; 260/244 R; 260/249.5; 260/249.9; 260/249.8; 260/78 R
[51] Int. Cl.²............: C07D 251/26; C07D 251/52
[58] Field of Search........... 260/249.5, 249.6, 249.8, 260/249.9, 247 SC, 243 AE, 244 R

[56] References Cited
UNITED STATES PATENTS
2,804,458  8/1957  Wheeler et al. ............... 260/249.6
3,843,649  10/1974  Seltzer et al. .................. 260/248

*Primary Examiner*—John M. Ford
*Attorney, Agent, or Firm*—Charles W. Vanecek

[57] ABSTRACT s-Triazine tetracarboxylic acids having the formula

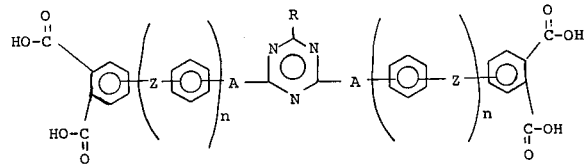

wherein R is an organic blocking group; A is NH, O, or S; Z is the direct bond, O, S, $SO_2$,

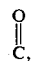

or $CH_2$; and $n$ is 0 or 1, can be prepared by reacting a dihalo triazine with a dicarboxylic acid substituted with an amino, hydroxy, or mercapto group. By dehydrating the acid a corresponding dianhydride is obtained. These compounds are useful in preparing various polymers, as, for example, polyimides.

6 Claims, No Drawings

S-TRIAZINE TETRACARBOXYLIC ACIDS AND DIANHYDRIDES

This invention relates to novel s-triazine tetracarboxylic acids and their anhydrides. The acids can be represented by the formula

[Structure I]

wherein
R is hydrogen, alkyl, cycloalkyl, aryl, substituted aryl, aralkyl, amino, diarylamino, di(lower)alkylamino, alkylamino, anilino, N-(lower)-alkylanilino, aryloxy, alkoxy, thioalkoxy, mercapto, thiophenoxy, nitrogen heterocyclic, halo, hydroxyl, or carboxyl;
A is NH, O, or S, preferably NH;
Z is the direct bond, O, S, $SO_2$, $$\underset{C}{\overset{O}{\parallel}},$$

or $CH_2$, preferably O and $$\underset{C}{\overset{O}{\parallel}};$$

and
$n$ is 0 or 1, preferably 0.

More specifically, the blocking group R is selected from the following groups:
a. hydrogen, amino, anilino, halo, especially chloro, hydroxyl, mercapto, and carboxyl,
b. alkyl which is a straight or branched chain group of up to 8 carbon atoms, e.g., methyl, ethyl, n-propyl, isopropyl, n-butyl, tert-butyl, n-hexyl, and n-octyl;
c. cycloalkyl of 3 to 6 carbon atoms, i.e., cyclopropyl, cyclobutyl, cyclopentyl, and cyclohexyl,
d. aryl, such as phenyl, naphthyl, biphenyl, and anthracyl, especially phenyl,
e. aryl substituted with groups such as nitro, halo, especially chloro and bromo, carboxyl, cyano, lower alkyl, hydroxy, aryl, or lower alkoxy of up to 4 carbon atoms. Illustrative examples of aryl substituted groups are carboxyphenyl, chlorophenyl, dichlorophenyl, bromophenyl, chloronaphthyl, methoxyphenyl, ethoxyphenyl, butoxyphenyl, tolyl, xylyl, ethylphenyl, diethylphenyl, butylphenyl and ethylnapthyl. By the "lower alkyl" mentioned above is meant straight or branched chain alkyl groups having up to 4 carbon atoms, such as methyl, ethyl, n-propyl, isopropyl, n-butyl, secbutyl, or t-butyl.
f. aralkyl, such as benzyl, 1-phenylhexyl and 1-phenylethyl,
g. di(lower)alkyl amino, such as dimethylamino, diethylamino, di-n-propylamino, diisopropylamino and di-n-butylamino,
h. N-(lower)alkylanilino, such as N-methyl anilino, N-ethyl anilino, and N-butyl anilino,
i. diarylamino such as dinaphthylamino and N-aryl anilino, e.g., diphenylamino and N-naphthyl anilino, especially diphenylamino,
j. alkylamino such as methylamino, n-propylamino and n-octylamino
k. alkoxy of up to 8 carbon atoms, thioalkoxy of up to 8 carbon atoms, thiophenoxy and aryloxy, especially phenoxy, and
l. nitrogen heterocyclic, which contains nitrogen in the ring, such as morpholino, pyrrolidino, piperidino, a group having the structure

[Structure]

where X is a covalent bond (9-carbazolyl group), oxygen (10-phenoxazinyl group) and sulfur (10-phenothiazinyl group),
a 1-indolyl group having the structure

[Structure]

a 2-isoindolyl group having the structure

[Structure]

a 1-imidazolyl group having the structure

[Structure]

and a 1-pyrroloyl group having the structure

[Structure]

s-Triazine compounds of this invention wherein A is NH have the advantageous property that the NH positions in the molecule provide potential crosslinking sites. These s-triazine compounds are also characterized by a relatively easy method of preparation. The compounds of this invention wherein n is 0 are also distinguished by their relatively easy method of preparation.

The tetracarboxylic acids of the invention are prepared by reacting a dihalo triazine with a dicarboxylic acid of the formula

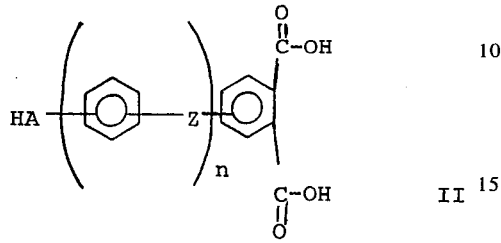

wherein A, Z and n are as defined above. The tetracarboxylic acid can then be dehydrated to yield the corresponding dianhydride. The tetraacid is dehydrated by conventional methods such as, for example, refluxing in nitrobenzene, refluxing in acetic anhydride or heating the acid in the solid state and removing water by vacuum.

Both the dihalo triazines and the dicarboxylic acids used in this invention are either well known materials or are readily preparable from known materials by known methods from the literature.

Illustrative examples of the tetracarboxylic acid dianhydrides of the invention are the following:

2-phenyl-4,6-bis(2',3'-dicarboxyanilino)-s-triazine dianhydride 2-anilino-4,6-bis(2',3'-dicarboxyanilino)-s-triazine dianhydride 2-dimethylamino-4,6-bis-4'-(3',4'-dicarboxybenzenesulfonyl)-anilino-s-triazine dianhydride 2-cyclohexyl-4,6-bis-(3',4'-dicarboxythiophenoxy)-s-triazine dianhydride 2hydroxy-4,6-bis-{4'-(3'',4''-dicarboxybenzoyl)-anilino}-s-triazine dianhydride 2-diphenylamino-4,6-bis-(3',4'-dicarboxythiophenoxy)-6-triazine dianhydride 2-chloro-4,6-bis-{4',3'',4''-dicarboxybenzoyl)-anilino}-s-triazine dianhydride 2-carboxy-4,6-bis(2',3'-dicarboxyanilino)-s-triazine dianhydride 2-mercapto-4,6-bis-4'-(3',4'-dicarboxybenzoyl)-anilino-s-triazine dianhydride 2-anilino-4,6-bis(2',3'-dicarboxyanilino)-s-triazine dianhydride 2-isopropyl-4,6-bis-{3'-(3'',4''-dicarboxybenzoyl)-anilino}-s-triazine dianhydride 2-piperidino-4,6-bis-{3'-(3'',4''-dicarboxybenzoyl)-anilino}-s-triazine dianhydride 2-amino-4,6-bis(2',3'-dicarboxyanilino)-s-triazine dianhydride 2-N-ethylanilino-4,6-bis(3',4'-dicarboxyanilino)-s-triazine dianhydride 2-(1'-pyrrolidyl)-4,6-bis{4'-(3'',4''-dicarboxybenzoyl)-anilino}-s-triazine dianhydride 2-chloro-4,6-bis-(3',4'-dicarboxythiophenoxyl)-s-triazine dianhydride 2-N-methylanilino-4,6-bis-4'-(3',4'-dicarboxybenzenesulfonyl)-anilino-s-triazine dianhydride.

The s-triazine dianhydrides of this invention can be used in the same manner as prior art dianhydrides such as benzophenonetetracarboxylic dianhydride or pyromellitic dianhydride. Thus, the s-triazine dianhydride can be reacted with a diamino compound to give the polyamide acid which, upon curing, yields a polyimide. The preparation of polyimides employing the dianhydrides of this invention are described in greater detail in our application filed on the same day as the instant application Ser. No. 489,227. The teachings of this copending application are incorporated herein by reference. The instant dianhydride will also undergo a condensation reaction with orthoaromatic tetraamines to yield polyimidazopyrrolones. By condensing the dianhydrides of this invention with bis-o-amino amides heterocyclic polymers known as polyisoendoquinozolenediones can be prepared. The s-triazine dianhydrides of this invention can also be used as epoxy curing agents.

To illustrate further the invention described above, the following examples are presented for illustrative purposes only.

EXAMPLE 1

2-Diphenylamino-4,6-bis-(2',3'-dicarboxyanilino)-s-triazine dianhydride

A solution of 42.6 g (0.20 mole) of 3-nitrophthalic acid in 200 ml of dioxane was hydrogenated at 50 lbs. in the presence of 0.20 g of platinum oxide. The resulting dioxane solution of 3-aminophthalic acid was filtered to remove the catalyst. To the filtrate was added 31.7 g (0.10 mole) of 2-diphenylamino-4,6-dichloro-s-triazine in 200 ml of dioxane followed by 50.4 g (0.60 mole) of sodium bicarbonate. The mixture was refluxed overnight, cooled to room temperature and filtered. The residue was dissolved in water and acidified with conc. HCl. The resulting precipitate was filtered, washed with water and then acetone to give 34.1 g of the s-triazine tetraacid, m.p. 340°–5°. The tetraacid was suspended in 250 ml of nitrobenzene and heated to reflux. The water of dehydration was removed with a Dean Stark trap. After the water was removed, the solution was refluxed for an additional 30 minutes and filtered hot. On cooling, the desired dianhydride crystallized. It was filtered, washed with acetone and dried; 16.8 g, m.p. 367°–370°.

Analysis for $C_{31}H_{18}N_6O_6$: Calculated: C, 65.20; H, 3.18; N, 14.72; Found: C, 64.92; H, 3.34; N, 14.48.

EXAMPLE 2

2-Diphenylamino-4,6-bis-(3',4'-dicarboxyanilino)-s-triazine dianhydride

To a solution of 54.3 g (0.30 mole) of 4-aminophthalic acid and 47.6 g (0.15 mole) of 2-diphenylamino-4,6-dichloro-s-triazine in 500 ml of N-methylpyrrolidone (NMP) was added 124.0 g (0.90 mole) of potassium carbonate. The mixture was heated at 100° for 20 hours, cooled to room temperature and filtered. The residue was washed with acetone and then dissolved in one liter of water. The aqueous solution was acidified with conc. HCl and the resulting precipitate filtered and dried to give 69.1 g of the tetraacid. The tetraacid was suspended in 500 ml of nitrobenzene and treated as described in Example 1 to give 25.0 g of the dianhydride, m.p. 350°–356°. Recrystallization from nitrobenzene gave 15.5 g, m.p. 352°–56°.

Analysis for $C_{31}H_{18}N_6O_6$: Calculated: C, 65.20; H, 3.18; N, 14.72; Found: C, 64.49; H, 3.44; N, 14.70.

EXAMPLE 3

2-Phenyl-4,6-bis-(2',3'-dicarboxyanilino)-s-triazine dianhydride

A dioxane solution of 0.20 mole of 3-aminophthalic acid was prepared as described in Example 1. To this solution was added 22.6 g (0.10 mole) of 2-phenyl-4,6-dichloro-s-triazine in 150 ml of warm dioxane followed by 50.4 g (0.60 mole) of sodium bicarbonate. The mixture was refluxed overnight. After cooling to room temperature the mixture was filtered. The residue was stirred in 500 ml of water and filtered. The filtrate was acidified with conc. HCl, and the resulting precipitate filtered, washed with acetone and dried to give 11.1 g of the tetraacid, m.p. 304°–305°. Treating the tetraacid in 150 ml of refluxing nitrobenzene as described in Example 1 gave 4.1 g of the dianhydride, m.p. 320°–324°.

Analysis for $C_{25}H_{13}N_5O_6$: Calculated: C, 62.65; H, 2.73; N, 14.62; Found: C, 62.06; H, 2.64; N, 14.35.

EXAMPLE 4

2-Phenyl-4,6-bis-(3',4'-dicarboxyanilino)-s-triazine dianhydride

To a solution of 36.2 g (0.20 mole) of 4-aminophthalic acid and 22.6 g (0.10 mole) of 2-phenyl-4,6-dichloro-s-triazine in 300 ml of NMP was added 82.9 g (0.60 mole) of potassium carbonate. The mixture was heated overnight at 100°, cooled to room temperature and filtered. The residue was dissolved in one liter of water and acidified with conc. HCl. The resulting precipitate was filtered, washed with water and then with acetonitrile, and dried to give 38.0 g of the tetraacid, m.p. 315°–330°. Treating the tetraacid with 350 ml of nitrobenzene as described in Example 1 gave 3.7 g of the dianhydride, m.p. 350°–53°. A recrystallization from nitrobenzene gave 2.8 g., m.p. 359°–61°.

Analysis for $C_{25}H_{13}N_5O_6$: Calculated: C, 62.65; H, 2.64; N, 14.35; Found: C, 61.75; H, 3.10; N, 14.89.

EXAMPLE 5

2-Diphenylamino-4,6-bis-{4'-(3'',4''dicarboxybenzoyl)-anilino}-s-triazine dianhydride To a solution of 0.20 mole of 4-amino-3',4'-dicarboxybenzophenone and 0.10 mole of 2-diphenylamino-4,6-dichloro-s-triazine in 300 ml of NMP is added 0.60 mole of potassium carbonate. The reaction mixture is heated at 100°C for 24 hours and then treated essentially as in Example 1 to give 2-diphenylamino-4,6-bis-{4'-(3'',4''-dicarboxybenzoyl)-anilino}-s-triazine. The tetraacid is heated in refluxing nitrobenzene essentially as in Example 1 to yield the corresponding dianhydride.

EXAMPLE 6

2-Diphenylamino-4,6-bis-(3',4'-dicarboxyphenoxy)-s-triazine dianhydride

To a solution of 0.30 mole of 4-hydroxyphthalic acid and 0.15 mole of 2-diphenylamino-4,6-dichloro-s-triazine in 500 ml of NMP is added 0.90 mole of powdered sodium hydroxide. The mixture is heated at 100°C for 24 hours and then worked up essentially as described in Example 1 to give the tetraacid. The tetraacid is heated in refluxing nitrobenzene essentially as in Example 1 to yield the corresponding dianhydride.

EXAMPLE 7

2-Phenyl-4,6-bis-(3',4'-dicarboxythiophenoxyl)-s-triazine dianhydride

To a solution of 0.20 mole of 4-mercaptophthalic acid and 0.10 mole of 2-phenyl-4,6-dichloro-s-triazine in 300 ml of NMP is added 0.60 mole of powdered sodium hydroxide in 300 ml of NMP. The reaction is heated at 100°C for 24 hours and then worked up essentially as described in Example 1 to give the tetraacid. The tetraacid is heated in refluxing nitrobenzene essentially as in Example 1 to yield the corresponding dianhydride.

EXAMPLE 8

2-Diphenylamino-4,6-bis-{4'-(3'',4''-dicarboxyphenoxy) anilino}-s-triazine dianhydride To a solution of 0.20 mole of 4-amino-3',4'-dicarboxydiphenyl ether and 0.10 mole of 2-diphenylamino-4,6-dichloro-s-triazine in 300 ml of NMP is added 0.60 mole of potassium carbonate. The mixture is heated at 100°C for 20 hours and then worked up essentially as in Example 1 to give the expected tetraacid. The corresponding dianhydride is obtained by refluxing the tetraacid in nitrobenzene essentially as described in Example 1.

What is claimed is:

1. An s-triazine dianhydride having the formula

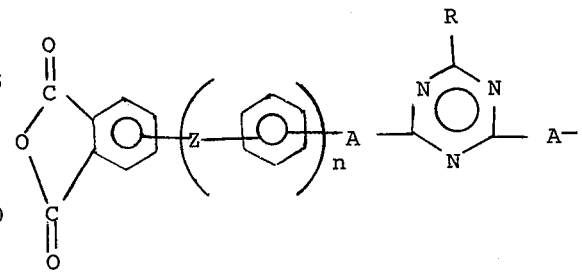

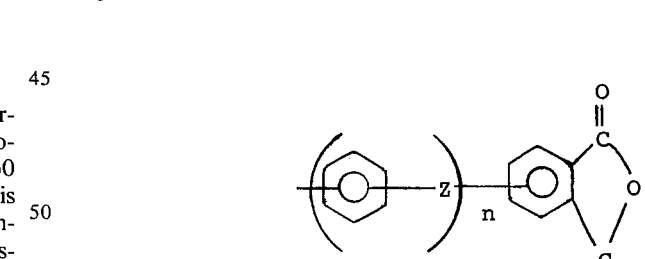

wherein

R is hydrogen; alkyl of up to 8 carbon atoms; cycloalkyl of 3 to 6 carbon atoms; phenyl; naphthyl; biphenyl; anthracyl; phenyl or naphthyl substituted by nitro, halo, carboxyl, cyano, lower alkyl of up to 4 carbon atoms; hydroxy or lower alkoxy of up to 4 carbon atoms; benzyl; 1-phenylhexyl; 1-phenylethyl; amino; dinaphthylamino; diphenylamino; N-naphthyl anilino; di(lower)alkylamino where each alkyl has up to 4 carbon atoms; alkylamino of 1 to 8 carbon atoms; anilino; N-(lower)alkylanilino where the alkyl has up to 4 carbon atoms; phenoxy; alkoxy of up to 8 carbon atoms;

thioalkoxy of up to 8 carbon atoms; thiophenoxy; mercapto; halo; hydroxyl; carboxyl; morpholino; pyrrolidino; piperidino; a group having the structure

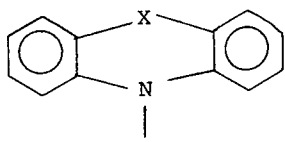

where X is a covalent bond (9-carbazolyl group), oxygen (10-phenoxazinyl group) and sulfur (10-phenothiazinyl group), a 1-indolyl group having the structure

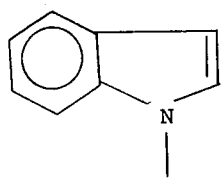

a 2-isoindolyl group having the structure

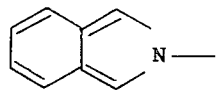

a 1-imidazolyl group having the structure

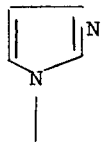

or a 1-pyrroloyl group having the structure

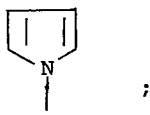
;

A is NH, O, or S;
Z is the direct bond, O, S, $SO_2$,

or $CH_2$; and $n$ is 0 or 1.

2. The compound of claim 1 wherein R is phenyl or diphenylamino.

3. The compound of claim 2 wherein A is NH and $n$ is 0.

4. An s-triazine tetracarboxylic acid having the formula

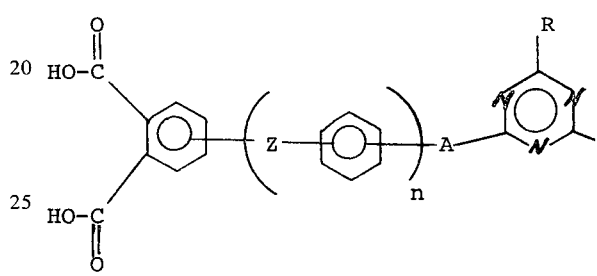

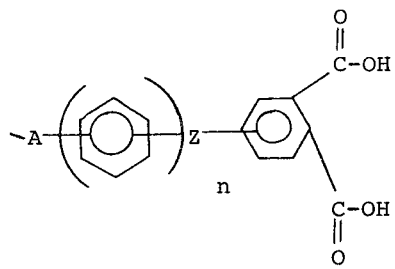

wherein R, A, Z, and n are as defined in claim 1.

5. The compound of claim 4 wherein R is phenyl or diphenylamino.

6. The compound of claim 5 wherein A is NH and $n$ is 0.

* * * * *